(12) United States Patent
Stegemann et al.

(10) Patent No.: US 12,284,053 B2
(45) Date of Patent: Apr. 22, 2025

(54) TRANSMITTING/RECEIVING DEVICE FOR A BUS SYSTEM AND METHOD FOR REDUCING LINE EMISSIONS IN A BUS SYSTEM

(71) Applicant: Robert Bosch GmbH, Stuttgart (DE)

(72) Inventors: Sebastian Stegemann, Tuebingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 436 days.

(21) Appl. No.: 17/775,478

(22) PCT Filed: Nov. 17, 2020

(86) PCT No.: PCT/EP2020/082379
§ 371 (c)(1),
(2) Date: May 9, 2022

(87) PCT Pub. No.: WO2021/099304
PCT Pub. Date: May 27, 2021

(65) Prior Publication Data
US 2022/0400029 A1 Dec. 15, 2022

(30) Foreign Application Priority Data
Nov. 18, 2019 (DE) ..................... 10 2019 217 729.8

(51) Int. Cl.
*H04L 12/20* (2006.01)
*H04L 12/40* (2006.01)

(52) U.S. Cl.
CPC .............. *H04L 12/40032* (2013.01); *H04L 2012/40215* (2013.01)

(58) Field of Classification Search
CPC ......... H04L 12/20; H04L 12/41; H04L 12/40; H04L 25/02; H04L 25/03; H04L 25/08;
(Continued)

(56) References Cited

U.S. PATENT DOCUMENTS 8,593,202 B2 * 11/2013 Mori ................. H04L 25/026
326/23
9,178,764 B2 * 11/2015 Hartwich ............. H04L 41/083
(Continued)

FOREIGN PATENT DOCUMENTS

DE 102018203672 A1 9/2019
EP 3541031 A1 9/2019

OTHER PUBLICATIONS

ISO 11898-1:2015, "Standard, Road Vehicles—Controller Area Network (Can)—Part 1: Data Link Layer and Physical Signalling," 2015, pp. 1-74.

(Continued)

*Primary Examiner* — Man U Phan
(74) *Attorney, Agent, or Firm* — NORTON ROSE FULBRIGHT US LLP; Gerard A. Messina

(57) ABSTRACT

A transmitting/receiving device for a bus system and a method for reducing an oscillation tendency in the transition between different bit states. The transmitting/receiving device has a transmitting stage for transmitting a transmission signal to a first bus wire of a bus of the bus system and for transmitting the transmission signal as an inverse signal to a second bus wire of the bus, and an asymmetry reduction module for reducing an asymmetry of bus signals arising in the bus wires. The asymmetry reduction module includes a polarity reversing diode, whose cathode is connected to the cathode of a reverse polarity diode of the transmitting stage. The asymmetry reduction module switches a potential of the cathode of the polarity reversing diode to a potential that is greater than or equal to a level of a recessive bus state.

24 Claims, 4 Drawing Sheets

(58) Field of Classification Search
CPC ......... H04L 25/12; H04L 29/06; G06F 13/40;
G06F 13/36; G06F 13/42; G06F 11/07;
G06F 11/10; G06F 11/30; G06F 13/37
USPC ........................................................ 370/257
See application file for complete search history.

(56) References Cited

U.S. PATENT DOCUMENTS

| | | | |
|---|---|---|---|
| 9,606,948 B2* | 3/2017 | Monroe | G06F 13/364 |
| 10,187,229 B2* | 1/2019 | Robertson | H04L 25/028 |
| 10,313,152 B2* | 6/2019 | Kishigami | H03F 3/24 |
| 10,530,612 B2* | 1/2020 | Pannwitz | H04L 25/0274 |
| 10,615,996 B2* | 4/2020 | de Haas | H04L 25/0278 |
| 10,791,002 B2* | 9/2020 | de Haas | H04L 12/40045 |
| 11,061,844 B2* | 7/2021 | de Haas | G06F 13/4027 |
| 11,068,429 B2* | 7/2021 | Brando | H04L 12/40013 |
| 11,218,335 B2* | 1/2022 | Pannwitz | H04L 25/08 |
| 11,601,301 B2* | 3/2023 | Stegemann | H04L 12/40032 |
| 12,074,578 B2* | 8/2024 | Stegemann | H03H 11/245 |
| 2018/0041361 A1 | 2/2018 | Kishigami et al. | |

OTHER PUBLICATIONS

International Search Report for PCT/EP2020/082379, Issued Feb. 15, 2021.

* cited by examiner

TRANSMITTING/RECEIVING DEVICE FOR A BUS SYSTEM AND METHOD FOR REDUCING LINE EMISSIONS IN A BUS SYSTEM

FIELD

The present invention relates to a transmitting/receiving device for a bus system and to a method for reducing line emissions in a bus system. The bus system is in particular a CAN and/or CAN FD bus system. The transmitting/receiving device is in particular usable in a CAN or CAN FD bus system.

BACKGROUND INFORMATION

In a bus system, information and data, which are contained in bytes or bits, are transmitted as messages via a bus between bus subscribers. For this purpose, the items of information are represented by different bit states or voltage states. In the transmission of the message via the bus of the bus system, the different bit states result in different bus states. Depending on the bus system, different transmission protocols exist for message or data transmission.

In CAN bus systems, for example, messages are transmitted via the CAN and/or CAN FD protocol, as is described in the ISO-11898-1:2015 standard as CAN protocol specification with CAN FD. Today, the CAN bus system is widely used for communication between sensors and control devices, CAN FD being currently in the introductory phase. The CAN bus system is often used in vehicles or automation systems, etc. for communication between the individual bus subscribers.

For the data transmission in a CAN bus system, an adherence to predetermined parameters is required. Apart from adherence to functional parameters, the emission, the interference immunity (direct pin injection—DPI) and the protection against electrostatic discharge (ESD) are taken into consideration.

The measurement of the line emission of CAN or CAN FD transceivers, or CAN or CAN FD transmitting/receiving devices, occurs in accordance with the 150 Ohm method (IEC 61967-4, Integrated circuits, Measurement of electromagnetic emissions, 150 kHz to 1 GHz—Part 4: Measurement of conducted emissions—1/150 direct coupling method) and in accordance with IEC 62228 (EMC evaluation of CAN Transceivers). In the emission measurement, a subdivided alternating voltage signal is evaluated, which is formed on both bus wires of the bus line for the signals CAN_H and CAN_L.

The structure of the EMV measurement is defined in the document "IEC TS 62228 Integrated circuits—EMC evaluation of CAN transceivers". For this purpose, three transmitting/receiving devices are operated on the same CAN bus using a common 60 Ohm terminal resistor and a decoupling network. One of the transmitting/receiving devices transmits a transmission signal, the other transmitting/receiving devices being in the same operating mode, but not transmitting a dominant bit or a dominant signal state, so that the transmission signals of these other transmitting/receiving devices are high=recessive. The resulting dominant bus state is able to overwrite the resulting recessive bus state.

It is problematic that the same emission limits must be observed in CAN FD as in CAN, even though in CAN FD with 2 Mbit/s and 5 Mbit/s the bit rate is increased 4-fold to 10-fold in comparison to classic CAN at 500 kbit/s. This represents a massive challenge for fulfilling the requirements for adhering to the parameters for line emission, which is not solvable or not satisfactorily solvable using present methods.

SUMMARY

It is an object of the present invention to provide a transmitting/receiving device for a bus system and a method for reducing line emissions in a bus system, which resolve the aforementioned problems. In particular, in accordance with the present invention, a transmitting/receiving device for a bus system and a method for reducing line emissions in a bus system are to be provided, which are able to form the voltage curve on the bus line for signals CAN_H, CAN_L in symmetrical fashion, in order thus to reduce the line emissions.

The object may be attained by a transmitting/receiving device for a bus system in accordance with the present invention. In accordance with an example embodiment of the present invention, the transmitting/receiving device comprises a transmitting stage for transmitting a transmission signal to a first bus wire of a bus of the bus system and for transmitting the transmission signal as an inverse signal to a second bus wire of the bus, and an asymmetry reduction module for reducing an asymmetry of bus signals arising on the bus wires, the asymmetry reduction module having a polarity reversing diode, whose cathode is connected to the cathode of a reverse polarity diode of the transmitting stage, the asymmetry reduction module being designed to switch a potential of the cathode of the polarity reversing diode to a potential that is greater than or equal to a level of a recessive bus state, and the transmitting stage being designed to generate the two bus states for the transmission signal in such a way that the recessive bus state is overwritable by a dominant bus state.

The described transmitting/receiving device in accordance with an example embodiment of the present invention makes it possible to avoid a highly asymmetrical curve of the voltage on bus wires CAN_H, CAN_L of the bus line, which is caused in the transmitting stage of the transmitting/receiving device by necessary reverse polarity diodes. The reverse polarity diodes for each bus wire CAN_H, CAN_L are necessary in order to prevent an unwanted current flow on bus wires CAN_H, CAN_L for the maximally occurring voltages between −27V and 40V of the CAN FD requirements (maximum ratings). The transmitting/receiving device is able to prevent a parasitic reverse recovery effect due to the necessary reverse polarity diode in the change from the dominant to the recessive bus state, which results in a highly asymmetrical curve of the bus wires. The parasitic reverse recovery effect arises due to a parasitic diode, which forms in integrated circuits for these reverse polarity diodes vis-a-vis a semiconductor substrate. This results in a behavior that corresponds to the behavior of a pnp transistor, whose n-doped base is formed by the shared cathode. For integrated components, with the aid of which a reverse polarity diode is implemented, one also speaks in this connection of parasitic bipolar transistors.

In addition, with the aid of the described transmitting/receiving device in accordance with the present invention, it is possible to achieve a great reduction of superimposed, parasitic currents in the bus wire for the signal CAN_L in the change from a dominant bus state to a recessive bus state, which is also called a dominant-recessive transition.

Another advantage of the described transmitting/receiving device of the present invention is the fact that due to the additional reverse polarity diode, the recessive level is at no point in time actively driven. This is of great advantage in particular compared to another alternative such as for example "nulling", in which voltage is actively applied to the dominant-recessive transition.

On the whole, the described transmitting/receiving device of the present invention makes it possible to achieve an increased symmetry of the voltages in the two bus wires CAN_H, CAN_L in the dominant-recessive transition. Moreover, it is possible to achieve an increase of the symmetry of the two bus wires CAN_H, CAN_L with respect to their impedance.

As a result, it is possible to achieve a massive improvement of the emission levels, in particular of spurious emission, in particular by some dBpV.

This reduces the line emission and improves the electromagnetic compatibility (EMC) of the transmitting/receiving device. The present invention helps to reduce the emission of the transmitting/receiving device at CAN FD bit rates and makes a large contribution toward maintaining the limiting values.

The effect of the transmitting/receiving device is particularly advantageous when using a common mode choke, which usually has an inductance value of 100 pH, since in such a use particularly highly increased emission levels occur when using a conventional transmitting/receiving device.

Advantageous further developments of the transmitting/receiving device of the present invention are disclosed herein.

According to one exemplary embodiment of the present invention, the asymmetry reduction module has a resistor and a switch, which are connected in series to the polarity reversing diode. In addition, an adjusting circuit for adjusting the value of the resistance may be provided in order to reduce the duration of the asymmetry of the bus signals arising in the bus wires.

According to another exemplary embodiment of the present invention, the asymmetry reduction module has a reverse polarity current adjusting block and a switch, which are connected in series to the polarity reversing diode. In this connection, the reverse polarity current adjusting block may be designed as an adjustable resistor, whose resistance value is adjustable. Alternatively, the reverse polarity current adjusting block has at least one CMOS current mirror.

The transmitting/receiving device may additionally include a logic circuit for switching off the asymmetry reduction module after the expiration of a predetermined time period after the asymmetry reduction module was switched off.

It is possible that the transmitting/receiving device additionally has an adjusting circuit for adjusting a point in time and the time duration of the switching on of the asymmetry reduction module.

In accordance with an example embodiment of the present invention, the adjusting circuit is possibly designed to monitor the curve of the cathode voltage of the polarity reversing diode for regulating the asymmetry. For this purpose, the adjusting circuit may be designed to change the value of a voltage, which is fed into the asymmetry reduction module at a connection, in order to switch the cathode voltage of the polarity reversing diode to a potential that is greater than or equal to a level of the recessive bus state.

Additionally or alternatively, for regulating the asymmetry, the adjusting circuit is designed to monitor the curve of the bus signals at their connection for the bus wires at the transmitting stage.

The transmitting/receiving device may be designed for transmitting and receiving messages according to the CAN FD protocol.

Optionally, the asymmetry reduction module is designed in such a way that the asymmetry reduction module is activated only when the transmitting stage transmits a message onto the bus.

The above-described transmitting/receiving device of the present invention may be part of a bus system, which includes a bus, and at least two subscriber stations, which are connected via the bus in such a way that they are able to communicate with one another. For this purpose, at least one of the at least two subscriber stations includes an above-described transmitting/receiving device.

The aforementioned object may additionally be attained by a method for reducing line emissions in a bus system in accordance with the present invention. The method is carried out using a transmitting/receiving device for a bus system, which includes a transmitting stage and an asymmetry reduction module. In accordance with an example embodiment of the present invention, the method comprising the steps: transmitting, using the transmitting stage, a transmission signal to a first bus wire of a bus of the bus system, transmitting, using the transmitting stage, the transmission signal as an inverse signal to a second bus wire of the bus, and reducing, using the asymmetry reduction module, an asymmetry of a bus signal arising on the bus wires, the asymmetry reduction module including a polarity reversing diode, whose cathode is connected to the cathode of the reverse polarity diode of the transmitting stage, wherein the asymmetry reduction module switches a potential of the cathode of the polarity reversing diode to a potential that is greater than or equal to a level of a recessive bus state, and wherein the transmitting stage generates the two bus states for the transmission signal in such a way that the recessive bus state is overwritable by a dominant bus state.

The method offers the same advantages as were mentioned above with reference to the transmitting/receiving device.

Additional possible implementations of the present invention also include combinations of features or specific embodiments not explicitly mentioned above or below with regard to the exemplary embodiments. One skilled in the art will also add individual aspects as improvements or supplementations to the respective basic form of the present invention, in view of the disclosure herein.

BRIEF DESCRIPTION OF THE DRAWINGS

The present invention is described below in greater detail with reference to the figures and on the basis of exemplary embodiments.

FIG. 3 shows a time characteristic of a voltage U of the bus signals CAN_H and CAN_L in the transmitting/receiving device of FIG. 2, when the asymmetry reduction module is not switched on.

FIG. 4 shows a time characteristic of the voltage U of the bus signals CAN_H and CAN_L in the transmitting/receiving device of FIG. 2, when the asymmetry reduction module is switched on.

Unless indicated otherwise, identical or functionally equivalent elements are provided with the same reference characters in the figures.

DETAILED DESCRIPTION OF EXAMPLE EMBODIMENTS

Figure 1:
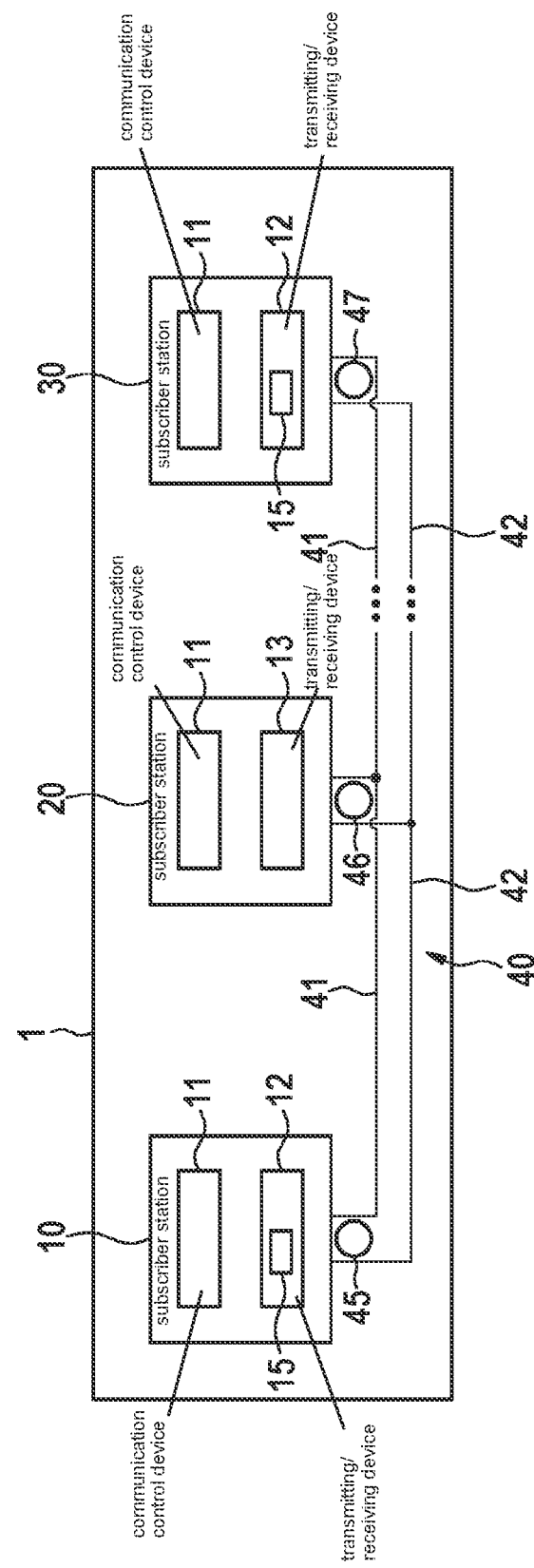
FIG. 1 shows a simplified block diagram of a bus system according to a first exemplary embodiment of the present invention.

FIG. 1 shows a bus system 1, which may be for example, at least in sections, a CAN bus system, a CAN FD bus system, etc. Bus system 1 may be used in a vehicle, in particular a motor vehicle, in an aircraft etc., or in a hospital etc.

In FIG. 1, bus system 1 has a plurality of subscriber stations 10, 20, 30, which are respectively connected to a bus 40 having a first bus wire 41 and a second bus wire 42. Bus wires 41, 42 may also be called CAN_H and CAN_L and are used for electrical signal transmission after coupling in the dominant levels or generating recessive levels for a signal in the transmitting state. Messages 45, 46, 47 are transmittable via bus 40 in the form of signals between the individual subscriber stations 10, 20, 30. Subscriber stations 10, 20, 30 are for example control units or display devices of a motor vehicle.

As shown in FIG. 1, the subscriber stations 10, 30 each have a communication control device 11 and a transmitting/receiving device 12. The transmitting/receiving devices 12 each comprise an asymmetry reduction module 15. Subscriber station 20, on the other hand, has a communication control device 11 and a transmitting/receiving device 13. The transmitting/receiving devices 12 of subscriber stations 10, 30 and the transmitting/receiving device 13 of the subscriber station 20 are each connected directly to bus 40, even if this is not illustrated in FIG. 1.

Communication control device 11 is used for controlling a communication of the respective subscriber station 10, 20, 30 via bus 40 with another subscriber station of the subscriber stations 10, 20, 30 that are connected to bus 40. Transmitting/receiving device 12 is used to transmit messages 45, 47 in the form of signals and for this purpose uses the asymmetry reduction module 15, as will be described in more detail later. The communication control device 11 may be designed in particular like a conventional CAN FD controller and/or CAN controller. The transmitting/receiving device 13 may be designed in particular like a conventional CAN transceiver and/or CAN FD transceiver. The transmitting/receiving device 13 may be designed in particular like a conventional CAN transceiver.

Figure 2:
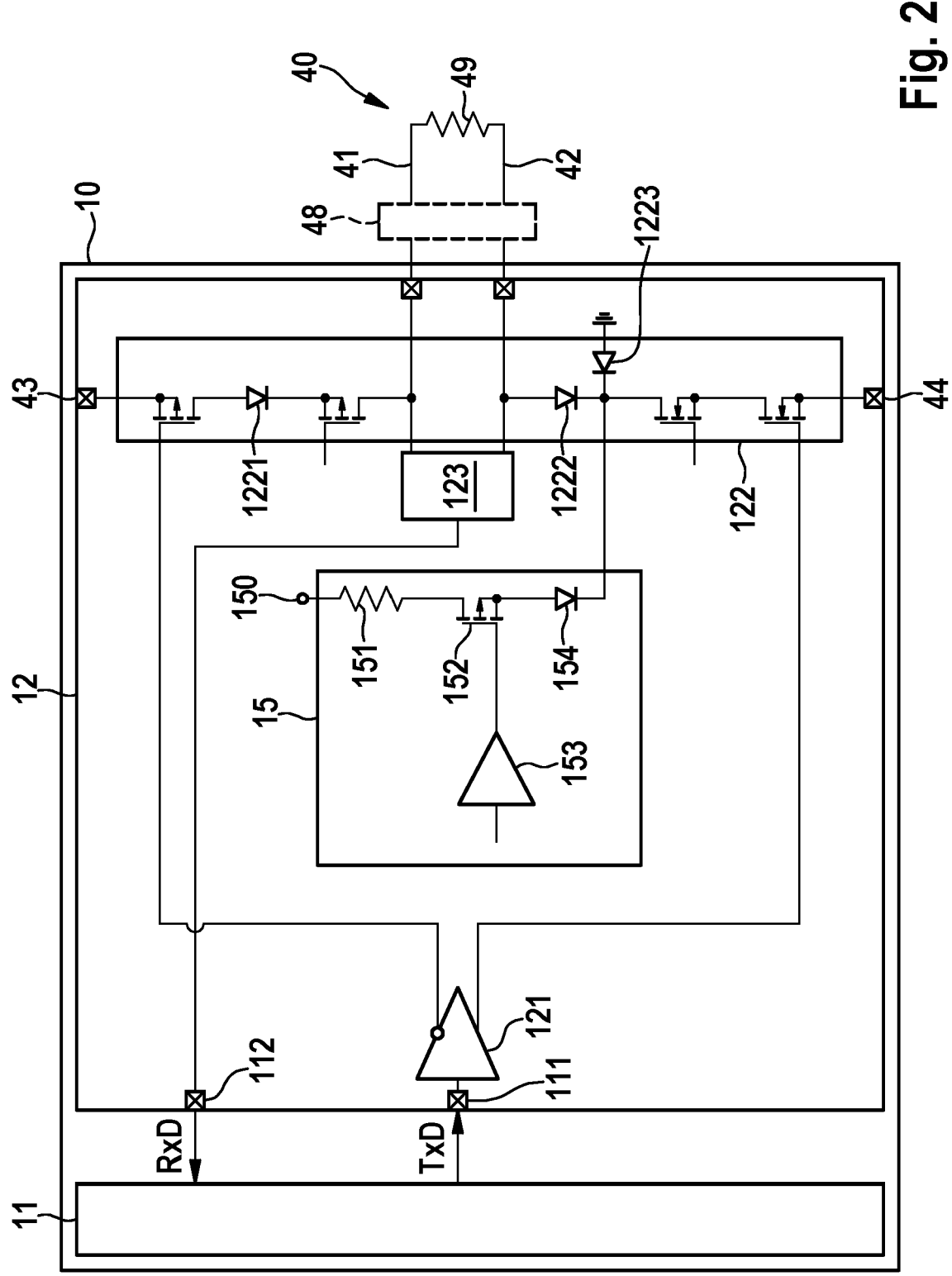
FIG. 2 shows an electrical circuit diagram of a transmitting/receiving device of the bus system according to the first exemplary embodiment of the present invention.

FIG. 2 shows the basic structure of subscriber station 10, in particular its transmitting/receiving device 12 together with the asymmetry reduction module 15. Subscriber station 30 is constructed in the same manner as subscriber station 10.

The transmitting/receiving device 12 has a transmitting driver 121 and a transmitting stage 122 as well as the asymmetry reduction module 15. In addition, transmitting/receiving device 12 has a receiving stage 123, which however is not shown in more detail in FIG. 2 for the sake of simplifying the drawing.

Transmitting/receiving device 12 is connected to bus 40, more precisely to its first bus wire 41 for CAN_H and its second bus wire 42 for CAN_L. The voltage supply, in particular CAN supply, for the first and second bus wires 41, 42 occurs via a connection 43. The connection to ground or CAN_GND is implemented via a connection 44. Optionally, a common mode choke 48 is connected between the first and the second bus wires 41, 42. The common mode choke 48 protects the transmitting/receiving device 12 against overvoltages, in particular undesired electrostatic discharges (ESD). The first and the second bus wires 41 and 42 are terminated by a terminal resistor 49.

The first and second bus wires 41, 42 are connected in the transmitting/receiving device 12 to the transmitting stage 122, which is also referred to as a transmitter. Furthermore, the first and second bus wires 41, 42 are connected in the transmitting/receiving device 12 to the receiving stage 123, which is also referred to as a receiver. For this purpose, the receiving stage 123 has, as is conventionally customary, a receiving comparator, which is connected to bus 40, although this is not shown in more detail in FIG. 2 for the sake of simplification.

The precise interface connection for driving a digital transmission signal TxD from the communication control device 11 occurs via a connection 111 as is conventionally customary. Moreover, the interface connection for driving a reception signal RxD from the transmitting/receiving device 12 to the communication control device 11 occurs via a connection 112 as is conventionally customary. This interface connection is thus not shown in FIG. 2 for the sake of simplification. The digital reception signal RxD was generated using the receiving stage 123 from the signal received from the bus wires 41, 42.

According to FIG. 2, the transmitting stage 122 is connected to a conventional driver 121 for the signals for the first and the second bus wires 41, 42. In addition, the asymmetry reduction module 15 is connected to the transmitting stage 122. Transmitting stage 122 has conventional semiconductor elements, a reverse polarity diode 1221 for the first bus wire 41 or the signal CAN_H, a reverse polarity diode 1222 for the second bus wire 42 or the signal CAN_L. In addition, a parasitic substrate diode 1223 of the semiconductor substrate of the transmitting stage 122 forms in operation. The cathodes of the reverse polarity diode 1222 for the second bus wire 42 or the signal CAN_L and the cathode of the parasitic substrate diode 1223 are connected to one another. The anode of the reverse polarity diode 1222 is grounded or connected to ground.

The asymmetry reduction module 15 comprises a connection 150 for a voltage supply V having a voltage VReverse, a resistor 151, a switch 152, a logic circuit 153 and a diode 154, which may also be referred to as a polarity reversing diode.

The cathode of the polarity reversing diode 154 is connected to the cathode of the reverse polarity diode 1222, which is provided for the second bus wire 42 or the signal CAN_L, and is connected to the cathode of the parasitic substrate diode 1223. The anode of the polarity reversing diode 154 is connected to the output of the switch 152.

The switch 152 is used to switch on or switch off the asymmetry reduction module 15 using logic circuit 153. In the process, the resistor 151 adjusts the flow of current from connection 150 via switch 152 to the cathode of polarity reversing diode 154. In FIG. 2, switch 152 is embodied as a transistor. The transistor may be a metal isolator field-effect transistor, for example. In particular, the transistor is a metal oxide field-effect transistor (MOSFET) or is embodied as a field-effect transistor having an isolated gate, which is also referred to as an IGFET.

Figure 3:
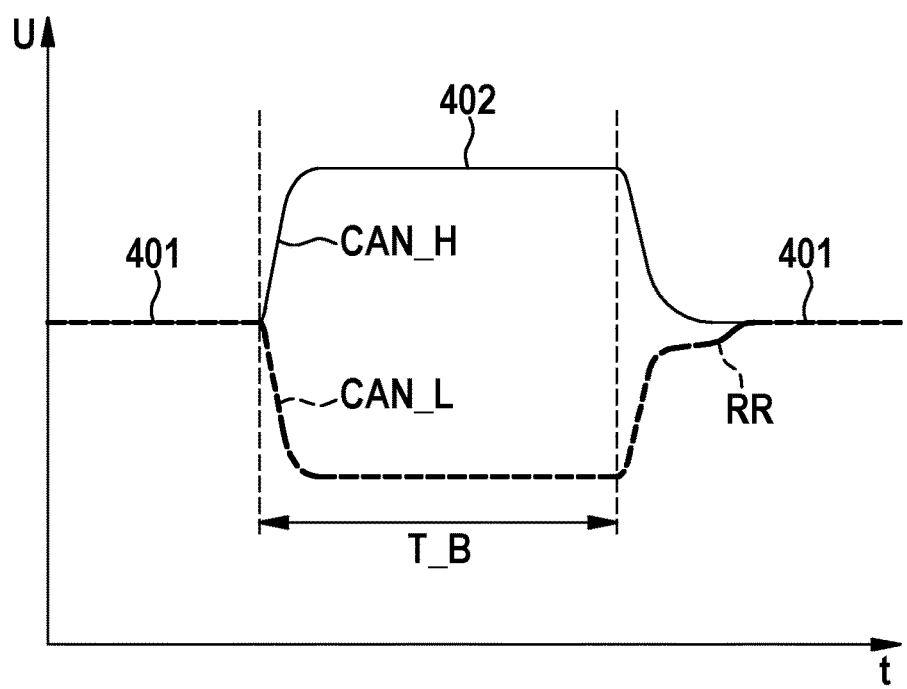

The asymmetry reduction module 15 thus comprises, in addition to logic circuit 153, a resistor 151, a switch 152 and a diode 154, which are connected in series in the aforementioned sequence, as shown in FIG. 3.

FIG. 3 shows a voltage curve for the signals CAN_H and CAN_L on bus wires 41, 42 of FIG. 2, when the asymmetry reduction module 15 is not switched on by logic circuit 153 and is thus not active. According to the stimulus at the TxD input 111, driver 1221 and transmitting stage 1222 drive the dominant bus state 402. In this state, in the circuit of FIG. 2, the current path from CAN SUPPLY at input 43 to the connection 44 for CAN_GND is closed via resistor 49, the bus load RL, so that the levels shown in FIG. 3 of the states 401, 402 set in in transmitting/receiving device 12 at bus outputs CAN_H and CAN_L for bus wires 41, 42. The signal CAN_L is generated as in inverse signal to CAN_H. The example of FIG. 3 illustrates a transition of signals CAN_H and CAN_L from a recessive bus state 401 to a dominant bus state 402 and back again to a recessive bus state 401. The switchover from the dominant bus state 402 to the recessive bus state 401 occurs after a bit time duration T_B. The dominant bus state 402 is generated in such a way that the dominant bus state 402 is able to overwrite the recessive bus state 401.

As clearly shown in FIG. 3, after the switchover from the dominant bus state 402 to the recessive bus state 401, an asymmetry RR of the signals CAN_H and CAN_L occurs. The asymmetry RR occurs due to the reverse recovery effect in the base of the parasitic PNP transistor of transmitting stage 122, which arises due to the parasitic diode 1223. The asymmetry RR is in other words a level offset of signals CAN_H and CAN_L following the change from the dominant bus state 402 to the recessive bus state 401.

The reason for the reverse recovery effect and thus the asymmetry RR is that in the change from the dominant bus state 402 to the recessive bus state 401 in transmitting stage 122 the current paths for the connections for the signals CAN_H and CAN_L are interrupted, so that the voltage curves of CAN_H and CAN_L adjust to the recessive bus state 401. During this transition, the cathode of reverse polarity diode 1222 in the CAN_L path becomes highly resistive in comparison to the connection 44 for CAN_GND. At the point in time, at which the cathode voltage of the reverse polarity diode 1222 has risen to such an extent that the forward voltage of the reverse polarity diode 1222 is undershot, charge carriers continue to remain in the shared n-doped cathode (base of the PNP transistor). These charge carriers can only be discharged as a recombination current. During this recombination time, a current flow remains from CAN_L to the semiconductor substrate, in particular silicon substrate, of transmitting stage 122. The current flow has the effect that the voltage at the connection for the signal CAN_L reaches the recessive bus state 401 clearly later and with a clearly different curve than the voltage at the connection for the signal CAN_H, as the asymmetry RR shows in FIG. 3.

In the bus wires 41, 42, this level offset of signals CAN_H and CAN_L during the transition from the dominant to the recessive bus state may be observed as a common mode signal and contributes substantially to the line emission. This effect is particularly considerable in the optional use of common mode chokes 48 on CAN bus 40. The level offset here acts as an excitation of the choke inductances and thereby effects common mode oscillations (ringing) on bus wires 41, 42, which results in highly increased emission levels.

The effect described here fundamentally occurs in all CAN FD systems, which are produced in smart power technologies with deep trench isolation (DTI) and for which the reverse polarity diodes 1221, 1222 of the transmitting stage 122 are produced from high-voltage components.

Figure 4:
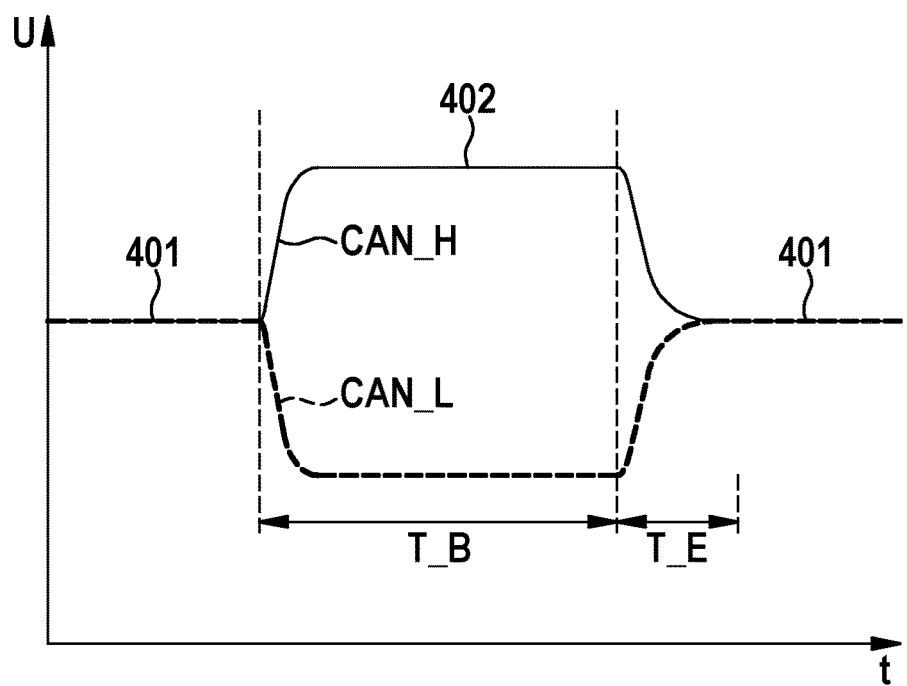

FIG. 4 shows a voltage curve for the signals CAN_H and CAN_L in bus wires 41, 42, when the asymmetry reduction module 15 is switched on by logic circuit 153 and switch 152 and is thus active. The example of FIG. 4 illustrates a transition of signals CAN_H and CAN_L from a recessive bus state 401 to a dominant bus state 402 and back again to a recessive bus state 401, as in FIG. 3. The logic circuit 153 switches switch 152 off again in particular after the expiration of a predetermined time duration T E or maximally after the time duration of a recessive bit. The time duration of a recessive bit may be equal to the time duration T_B, that is, equal to the time duration of a dominant bit.

The asymmetry reduction module 15 thus effects a minimization of the problematic reverse recovery effect by reversing the polarity of the reverse polarity diode 1222 in the CAN_L path. This is achieved in that using the asymmetry reduction module 15 the cathode of the reverse polarity diode 1222 is switched to a potential that is greater than or equal to the level of the recessive state 401 of signal CAN_L or the recessive level of signal CAN_L. In this manner, the recombination current is supplied substantially by the circuit of the asymmetry reduction module 15 and no longer via the bus wire 42 at the connection for the bus signal CAN_L. As a result, this polarity reversal shortens the duration of the reverse recovery effect in the CAN_L bus wire 42 and thus symmetrizes the voltage curve in comparison to the signal CAN_H in bus wire 41.

With the aid of resistor 151, the current is limited during the above-described polarity reversal. The diode 154 likewise acts as a reverse polarity diode for voltage levels on CAN_L that are greater than the level of the voltage VReverse. The maximum value (maximum rating) for this is 40V, as defined in the requirements for CAN.

In the operation of bus system 1, the logic circuit 153 of FIG. 2 detects when a switchover is to be made from a dominant bus state 402 to a recessive bus state 401. If the switchover from a dominant bus state 402 to a recessive bus state 401 is to be performed, then the logic circuit 153 switches the transistor 152, in order to perform the above-described switching of the cathode of the reverse polarity diode 1222 to the potential that is greater than or equal to the level of the recessive state 401 of the signal CAN_L. The logic circuit 153 switches transistor 152 off again after the predetermined time duration T E or maximally after the time duration of a recessive bit.

On account of the above-described structure, the asymmetry reduction module 15 has the advantage that the recessive level of the recessive state 401 of the signal CAN_L is at no point in time actively driven.

Using the transmitting/receiving device 12, a method for reducing line emissions in a bus system 1 is thus carried out. The oscillation or emission due to a transition between different bus states is clearly damped and thus reduced by the asymmetry reduction module 15.

According to a modification of the first exemplary embodiment, the subscriber station 20 also has a transmitting/receiving device 12 instead of a transmitting/receiving device 13. In this case, the above-described functionality of the transmitting/receiving device 12 is active for all subscriber stations 10, 20, 30 of the bus system, in particular as needed.

According to another modification of the first exemplary embodiment it is possible that the asymmetry reduction module 15 is designed in such a way that the asymmetry reduction module 15 is activated only when the transmitting stage 122 transmits a message 45 on bus 40.

Figure 5:
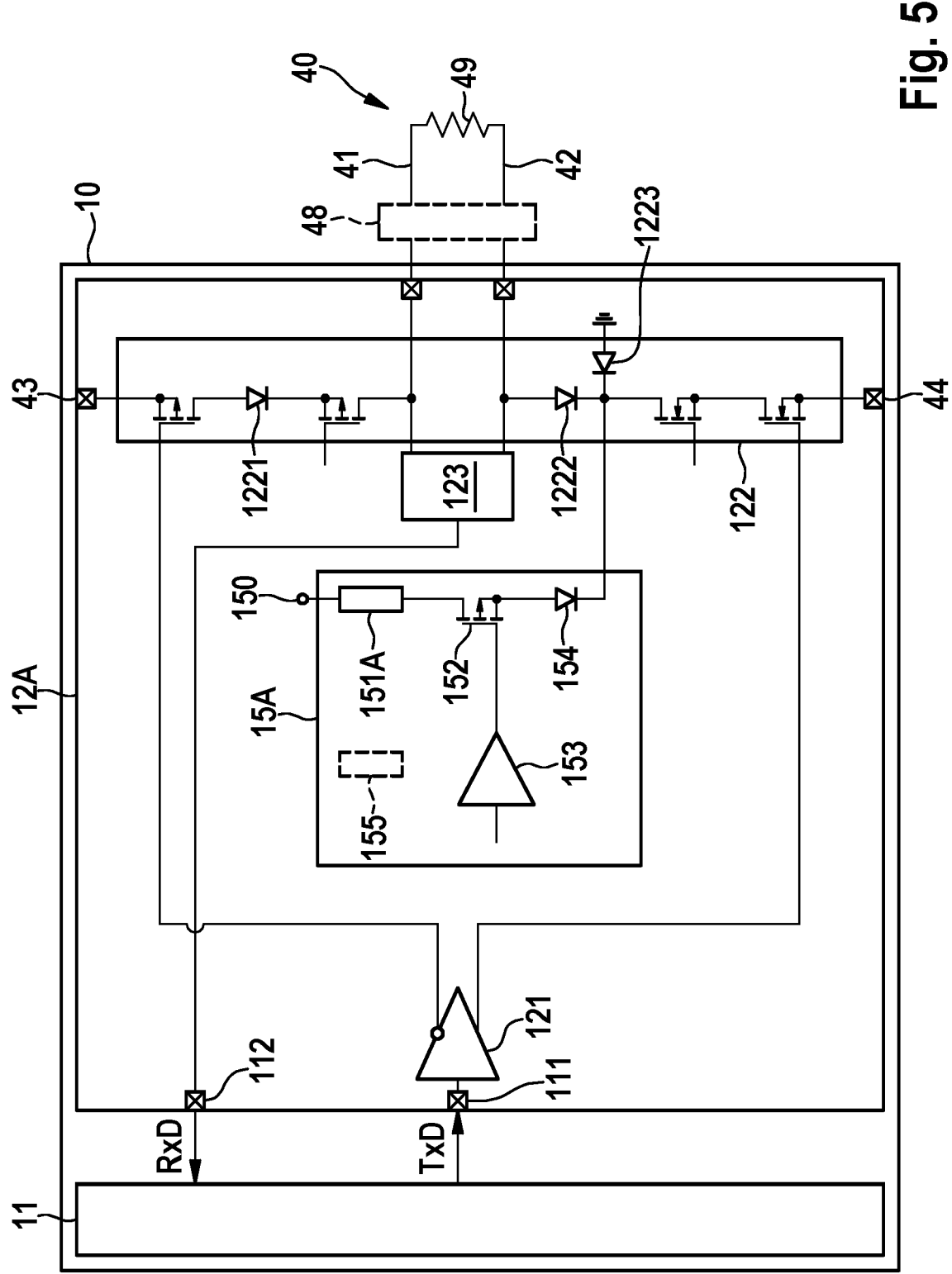
FIG. 5 shows an electrical circuit diagram of a transmitting/receiving device of a bus system according to a second exemplary embodiment of the present invention.

FIG. 5 shows the basic structure of a transmitting/receiving device 12A, which in contrast to FIG. 2 has an asymmetry reduction module 15A according to a second exemplary embodiment. Except for the differences described below, bus system 1 and the transmitting/receiving device 12A are constructed in the same manner as described above according to the above-described exemplary embodiment or its modifications for bus system 1 and transmitting/receiving device 12.

Instead of a resistor 151, the asymmetry reduction module 15A has a reverse polarity current adjusting block 151A. In addition, optionally an adjusting circuit 155 is also present.

The reverse polarity current adjusting block 151A is able to adjust the duration of the reverse recovery effect, in order to improve possible asymmetries to signal CAN_H. In particular, the duration of the reverse recovery effect is to be reduced.

For this purpose, the reverse polarity current adjusting block 151A may be designed as a configurable or adjustable resistor. Alternatively, the reverse polarity current adjusting block 151A may be designed for limiting the reverse polarity current and for the adjustability with the aid of CMOS current mirrors (CMOS=complementary metal oxide semiconductor). The reverse polarity current adjusting block 151A has at least one CMOS current mirror.

The optional adjusting circuit 155 makes it possible for the respective adjustment variable of the reverse polarity current to be adaptively changeable during operation. For this purpose, adjusting circuit 155 regulates the curve of the cathode voltage of diode 154. Alternatively, adjusting circuit 155 directly regulates or tracks or monitors the curve of the bus signals CAN_H and CAN_L at their connection for the bus wires 41, 42.

The asymmetry reduction module 15A has the advantage that in the case of the signals of FIG. 4 a greater symmetry of the signals CAN_H, CAN_L is achievable than in the preceding exemplary embodiment.

According to a third exemplary embodiment, it is possible for at least one of the asymmetry reduction modules 15, 15A to be designed in such a way that a user is able to configure the switch-on time and the time duration T E of the reverse polarity, that is, the switching on of the asymmetry reduction modules 15, 15A. This may be accomplished by an input in a software during the initial operation or during maintenance of the transmitting/receiving device 12.

In addition, the optional adjusting circuit 155 may be developed in such a way that the respective adjustment variable of switch-on time and time duration T E of the reverse polarity may be adaptively changeable during operation. For this purpose, adjusting circuit 155 regulates the curve of the cathode voltage of diode 154. Alternatively, adjusting circuit 155 directly regulates or tracks or monitors the curve of the bus signals CAN_H and CAN_L at their connection for the bus wires 41, 42.

This makes it possible for the user to influence the curve of the voltage of the signal CAN_L and to achieve a better symmetry of the signal CAN_L to signal CAN_H.

According to a fourth exemplary embodiment, it is possible for at least one of the asymmetry reduction modules 15, 15A to be developed in such a way that a user is able to configure the value of the reverse polarity voltage VReverse at connection 150. This may be accomplished by an input in a software during the initial operation or during maintenance of the transmitting/receiving device 12.

The configurability takes into account that the mechanism of action of the asymmetry reduction modules 15, 15A may be implemented by reverse polarity voltages VReverse of different magnitudes, which are at least as great as the recessive level on bus 40. The recessive level on bus 40 is typically at 2.5V, which corresponds to half the voltage for CAN SUPPLY at connection 43 of FIG. 2 and FIG. 5. A possible alternative is to choose the reverse polarity voltage VReverse=CAN SUPPLY, which is typically 5V.

In addition, the optional adjusting circuit 155 may be developed in such a way that the respective adjustment variable of the reverse polarity voltage VReverse at connection 150 may be adaptively changeable during operation. For this purpose, adjusting circuit 155 regulates the curve of the cathode voltage of diode 154. Alternatively, adjusting circuit 155 directly regulates or tracks the curve of the bus signals CAN_H and CAN_L at their connection for the bus wires 41, 42.

With the aid of the magnitude of the reverse polarity voltage, it is possible to influence the dynamics of the voltage curve at the cathode of the diode 154. This makes it possible to adjust the curve of signal CAN_L in comparison to the curve of signal CAN_H. As a result, it is possible for the user to influence the curve of the voltage of the signal CAN_L and to achieve a better symmetry of the signal CAN_L to signal CAN_H.

All of the above-described embodiments of asymmetry reduction modules 15, 15A, of transmitting/receiving devices 12, 12A, of subscriber stations 10, 20, 30, of bus system 1 and of the method carried out therein according to the exemplary embodiments and their modifications may be used individually or in all possible combinations. In addition, the following modifications are particularly possible.

The above-described bus system 1 according to the exemplary embodiments and/or their modifications are described on the basis of a bus system based on the CAN protocol. The bus system 1 according to the exemplary embodiments and/or their modifications, however, may also be another type of communication network. It is advantageous, but not an unavoidable presupposition, that in bus system 1, at least for certain time periods, exclusive, collision-free access by a subscriber station 10, 20, 30 to the bus line 40 is ensured.

Bus system 1 according to the exemplary embodiments and/or their modifications is in particular a CAN network or a CAN HS network or a CAN FD network or a FlexRay network. Bus system 1, however, is possibly another serial communication network.

In particular, the asymmetry reduction module 15, 15A may be used in LVDS (low voltage differential signaling), which is an interface standard for high-speed data transmission, in which a transmitter and a receiver are connected to one another via a data transmission link. LVDS is standardized according to ANSI/TIA/EIA-644-1995.

The number and the arrangement of the subscriber stations 10, 20, 30 in bus systems 1 according to the exemplary embodiments and/or their modifications is a matter of choice. In particular, it is possible that only subscriber stations 10 or subscriber stations 30 exist in the bus systems 1 of the exemplary embodiments and/or their modifications.

The functionality of the above-described exemplary embodiments and/or their modifications may be implemented respectively in a transceiver or a transmitting/receiving device 12, 12A or transceiver or a CAN transceiver or a transceiver chip set or a CAN transceiver chip set, etc. Additionally or alternatively, it may be integrated into existing products. In particular, it is possible that the respective functionality is implemented either in the transceiver as a separate electronic component (chip) or is embedded in an integrated overall solution, in which only one electronic component (chip) exists.

What is claimed is:

1. A transmitting/receiving device for a bus system, comprising:
a transmitting stage with which a transmission signal is transmittable to a first bus wire of a bus of the bus system and to transmit the transmission signal as an inverse signal to a second bus wire of the bus; and
an asymmetry reduction module having a structure by which an asymmetry of bus signals arising in the first and second bus wires is reduced, the asymmetry reduction module including a polarity reversing diode having a cathode connected to a cathode of a reverse polarity diode of the transmitting stage, wherein the reduction of the asymmetry includes the asymmetry reduction module switching a potential of the cathode of the polarity reversing diode to a potential that is greater than or equal to a level of a recessive bus state, and wherein the transmitting stage is structured such that the recessive bus state and a dominant bus state for the transmission signal are generated in a manner by which the recessive bus state is overwritable by the dominant bus state.

2. The transmitting/receiving device as recited in claim 1, wherein the asymmetry reduction module includes has a resistor and a switch, which are connected in series to the polarity reversing diode.

3. The transmitting/receiving device as recited in claim 2, further comprising:
an adjusting circuit with which a value of the resistor is adjustable to reduce a duration of the asymmetry of bus signals arising in the bus wires.

4. The transmitting/receiving device as recited in claim 1, wherein the asymmetry reduction module including a reverse polarity current adjusting block and a switch, which are connected in series to the polarity reversing diode.

5. The transmitting/receiving device as recited in claim 4, wherein the reverse polarity current adjusting block is an adjustable resistor, whose resistance value is adjustable.

6. The transmitting/receiving device as recited in claim 4, wherein the reverse polarity current adjusting block includes at least one CMOS current mirror.

7. The transmitting/receiving device as recited in claim 1, further comprising:
a logic circuit using which the polarity reversing diode can be switched off by the asymmetry reduction module after expiration of a predetermined time duration after the polarity reversing diode was switched on.

8. The transmitting/receiving device as recited in claim 1, further comprising:
an adjusting circuit using which a point in time and a time duration of a switching on of the polarity reversing diode is adjustable by the asymmetry reduction module.

9. The transmitting/receiving device as recited in claim 8, wherein performance of the adjustment of the point in time and the time duration is according to a monitoring of a curve of a cathode voltage of the polarity reversing diode for regulating the asymmetry.

10. The transmitting/receiving device as recited in claim 8, wherein a value of a voltage, which is fed into the asymmetry reduction module at a connection, is adjustable by the adjusting circuit to switch the cathode voltage of the polarity reversing diode to a potential that is greater than or equal to a level of the recessive bus state.

11. The transmitting/receiving device as recited in claim 1, further comprising:
as adjustment circuit, wherein, when the asymmetry reduction module is operated for regulating the asymmetry, the adjusting circuit monitors a curve of the bus signals at their connection for the bus wires at the transmitting stage and adjusts a potential of the polarity reversing diode according to the monitoring.

12. The transmitting/receiving device as recited in claim 1, wherein, when the transmitting/receiving device is operated for message transmission, the transmitting/receiving device transmits and receives messages according to the CAN FD protocol.

13. The transmitting/receiving device as recited in claim 1, wherein the asymmetry reduction module is structured such that the asymmetry reduction module is activated only when the transmitting stage transmits a message onto the bus.

14. A bus system comprising:
a bus; and
at least two subscriber stations which are connected to one another via the bus in such a way that they are able to communicate with one another;
wherein:
at least one of the at least two subscriber stations includes a transmitting/receiving device;
the transmitting/receiving device includes:
a transmitting stage with which a transmission signal is transmittable to a first bus wire of the bus of the bus system and to transmit the transmission signal as an inverse signal to a second bus wire of the bus; and
an asymmetry reduction module having a structure by which an asymmetry of bus signals arising in the first and second bus wires is reduced, the asymmetry reduction module including a polarity reversing diode having a cathode connected to a cathode of a reverse polarity diode of the transmitting stage;
the reduction of the asymmetry includes the asymmetry reduction module switching a potential of the cathode of the polarity reversing diode to a potential that is greater than or equal to a level of a recessive bus state; and
the transmitting stage is structured such that the recessive bus state and a dominant bus state for the transmission signal are generated in a manner by which the recessive bus state is overwritable by the dominant bus state.

15. A method for reducing line emissions in a bus system using a transmitting stage and an asymmetry reduction module of a transmitting/receiving device, the method comprising the following steps:
transmitting, using the transmitting stage, a transmission signal to a first bus wire of a bus of the bus system;
transmitting, using the transmitting stage, the transmission signal as an inverse signal to a second bus wire of the bus; and
reducing, using the asymmetry reduction module, an asymmetry of bus signals arising in the bus wires, wherein the asymmetry reduction module includes a polarity reversing diode whose cathode is connected to a cathode of a reverse polarity diode of the transmitting stage, the asymmetry reduction module switching a potential of the cathode of the polarity reversing diode to a potential that is greater than or equal to a level of a recessive bus state, and wherein the transmitting stage generates the recessive bus state and a dominant bus state for the transmission signal in such a way that the recessive bus state is overwritable by the dominant bus state.

16. The transmitting/receiving device as recited in claim 1, wherein the transmitting stage includes a first line connected to the first bus wire and a second line connected to the second bus wire, and the reverse polarity diode, whose cathode is connected to the cathode of the polarity reversing diode of the asymmetry reduction module, is in the second line of the transmitting stage.

17. The transmitting/receiving device as recited in claim 16, wherein the first line of the transmitting stage includes a further reverse polarity diode.

18. The transmitting/receiving device as recited in claim 17, wherein the reverse polarity diode of the second line is connected between the second bus wire and ground potential, and the further reverse polarity diode of the first line is connected between a voltage supply and the first bus wire.

19. The transmitting/receiving device as recited in claim 1, wherein the cathode of the polarity reversing diode of the asymmetry reduction module is also connected to a cathode of a parasitic substrate diode.

20. The transmitting/receiving device as recited in claim 1, wherein the asymmetry reduction module includes a logic circuit that switches the polarity reversing diode on and off depending on whether the transmitting/receiving device is switching between dominant bus state and the recessive bus state.

21. The transmitting/receiving device as recited in claim 20, wherein the logic circuit switches the polarity reversing diode on in response to the transmitting/receiving device transitioning from the dominant bus state to the recessive bus state.

22. The transmitting/receiving device as recited in claim 20, wherein the asymmetry reduction module further includes a resistor that modulates current flowing through the polarity reversing diode when the polarity reversing diode is switched on by the logic circuit.

23. The transmitting/receiving device as recited in claim 1, wherein the asymmetry reduction module includes:
  a logic circuit that switches the polarity reversing diode between an on state and an off state; and
  a resistor that modulates an amount of current flowing through the polarity reversing diode when the polarity reversing diode is in the on state.

24. The transmitting/receiving device as recited in claim 1, wherein the asymmetry reduction module includes a control that modulates a potential of the polarity reversing diode to be greater than or equal to a voltage level of the recessive bus state.

* * * * *